(12) United States Patent
Johnson et al.

(10) Patent No.: US 11,627,709 B1
(45) Date of Patent: Apr. 18, 2023

(54) HYDROPONIC PLANTER

(71) Applicants: Westen S. Johnson, Austin, TX (US); Julie Joo, Austin, TX (US)

(72) Inventors: Westen S. Johnson, Austin, TX (US); Julie Joo, Austin, TX (US)

( * ) Notice: Subject to any disclaimer, the term of this patent is extended or adjusted under 35 U.S.C. 154(b) by 81 days.

(21) Appl. No.: 17/247,255

(22) Filed: Dec. 4, 2020

Related U.S. Application Data

(60) Provisional application No. 62/943,963, filed on Dec. 5, 2019.

(51) Int. Cl.
*A01G 31/06* (2006.01)
*A01G 31/00* (2018.01)

(52) U.S. Cl.
CPC ........ *A01G 31/06* (2013.01); *A01G 2031/006* (2013.01)

(58) Field of Classification Search
CPC .. A01G 31/06; A01G 2031/006; A01G 9/029; A01G 9/0293; A01G 9/0299; A01G 9/024; A01G 9/022; A01G 9/023; A01G 9/247
See application file for complete search history.

(56) References Cited

U.S. PATENT DOCUMENTS

| | | | | |
|---|---|---|---|---|
| 9,210,846 | B2 * | 12/2015 | VanLente | A01G 9/025 |
| 9,883,642 | B2 * | 2/2018 | Friedman | A01G 9/025 |
| 2011/0215937 | A1 * | 9/2011 | Carroll | A01G 27/003 |
| | | | | 340/604 |
| 2011/0283613 | A1 * | 11/2011 | Downey | A01G 9/024 |
| | | | | 47/65.7 |
| 2011/0302837 | A1 * | 12/2011 | Chen | B32B 27/12 |
| | | | | 47/65.8 |
| 2012/0005958 | A1 * | 1/2012 | Laitsch | A01G 31/02 |
| | | | | 47/62 R |
| 2019/0269081 | A1 * | 9/2019 | Whitworth | A01G 31/06 |

* cited by examiner

*Primary Examiner* — Magdalena Topolski
*Assistant Examiner* — Katherine Anne Kloecker

(57) ABSTRACT

A hydroponic planter for indoors is a system comprising two or more sheets of plastic film or waterproof fabric panels heat-sealed together to form ducts and channels for nutritive water to circulate and feed plants. Plant holders enable placement of plants in varying positions in openings in the system. A pump in a reservoir circulates water through the system. The panels' flexible material enables portability.

5 Claims, 23 Drawing Sheets

HYDROPONIC PLANTER

TECHNICAL FIELD

The present disclosure relates to a hydroponic plant-growing system.

BACKGROUND

Hydroponics is a method of growing plants without soil by use of nutritive solutions in a water solvent. Terrestrial plants may be grown with only their roots exposed to the nutritive liquid, or the roots may be physically supported by inert media such as perlite or gravel.

Growing media may be in the form of contained aggregate media such as perlite or clay pebbles or in the form of rock wool, felt or sponge.

Heat sealing is a process of sealing thermoplastics together using heat and pressure. The direct contact method of heat sealing uses a constantly heated die or sealing bar to apply heat to a specific contact area or path to seal thermoplastics together. Heat sealing is used in, for example, heat-seal connectors, thermally activated adhesives, film media, plastic ports and foil sealing.

In this embodiment, plastic film is a thin, continuous polymeric material. Thick plastic material is referred to here as a sheet, Thin plastic membranes are used to separate areas or volumes; hold items; or act as barriers. Plastic films are used in, for example, packaging, plastic bags, labels, building construction, landscaping, electrical fabrication and other applications.

Waterproof fabrics may be inherently water-resistant or treated to be water resistant. They are made of natural or synthetic fabrics that are laminated, sprayed or coated with a waterproofing material such as rubber, polyvinyl chloride (PVC), polyurethane (PU) silicone elastomer, fluoropolymers, or wax, during or after fabric construction. Examples include rubberized fabrics used in rain coats and inflatable boats.

SUMMARY

A vertical hydroponic system is constructed of two or more layers of plastic film or waterproof fabric that are heat-sealed together to form a bag-like structure with multiple vertical channels. Nutrient-rich water is held in a reservoir at the bottom of the system and is pumped upward through the duct system. After flowing through the duct system the water exits the ducts at the top of the system and flows downward through the vertical channels, over the plant roots, and into the reservoir. Cuts in the front sheet of material create openings in the channels into which plants may be inserted. Plant holders and growing media lend structural support and help prevent leaking. The system can be scaled and the pattern repeated to grow as little or as many plants as desired.

One skilled in the art understands that contacting plant roots with nutrient-rich water will lead to plant growth. One skilled in the art understands that heat can bond materials like plastic without the need for adhesive.

DESCRIPTION

Figure 1:
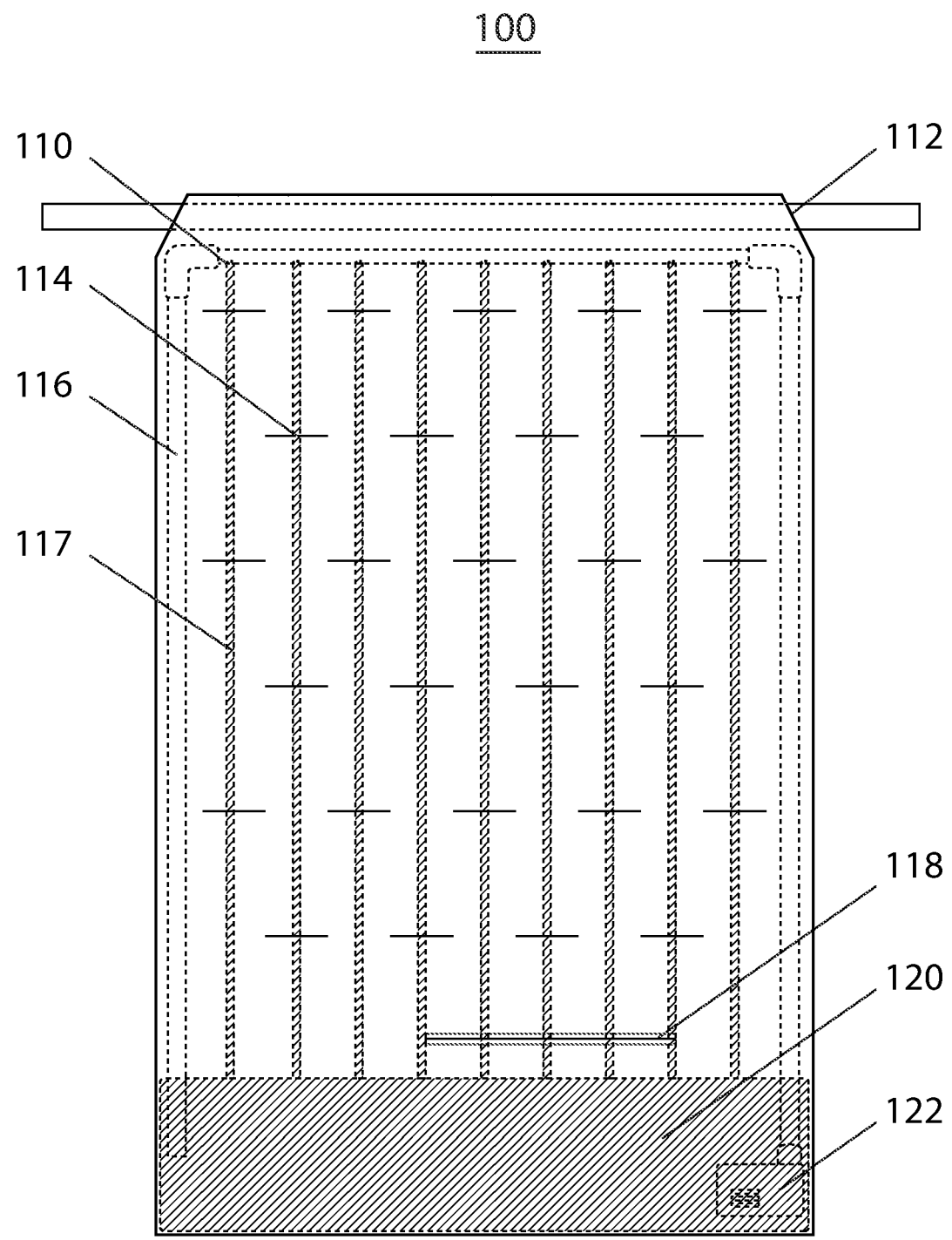
FIG. 1 is a front, orthographic view of the system.

FIG. 1, 100 illustrates a vertically oriented, heat-sealed panel system with a network of ducts that distributes nutrient-rich water throughout the system. A sleeve 112 is for hanging the embodiment on a rod. A reservoir 120 at the bottom of the system holds nutrient-rich water, which is distributed through the system by a pump 122 and a sub-system of ducts 116. Outlets 110 in the duct system send water downward in channels 117 into the reservoir 120. A resealable opening 118 accepts water to be added or removed from the reservoir 120. Openings 114 are intended to receive and orient plants into water channels 117.

Figure 2:
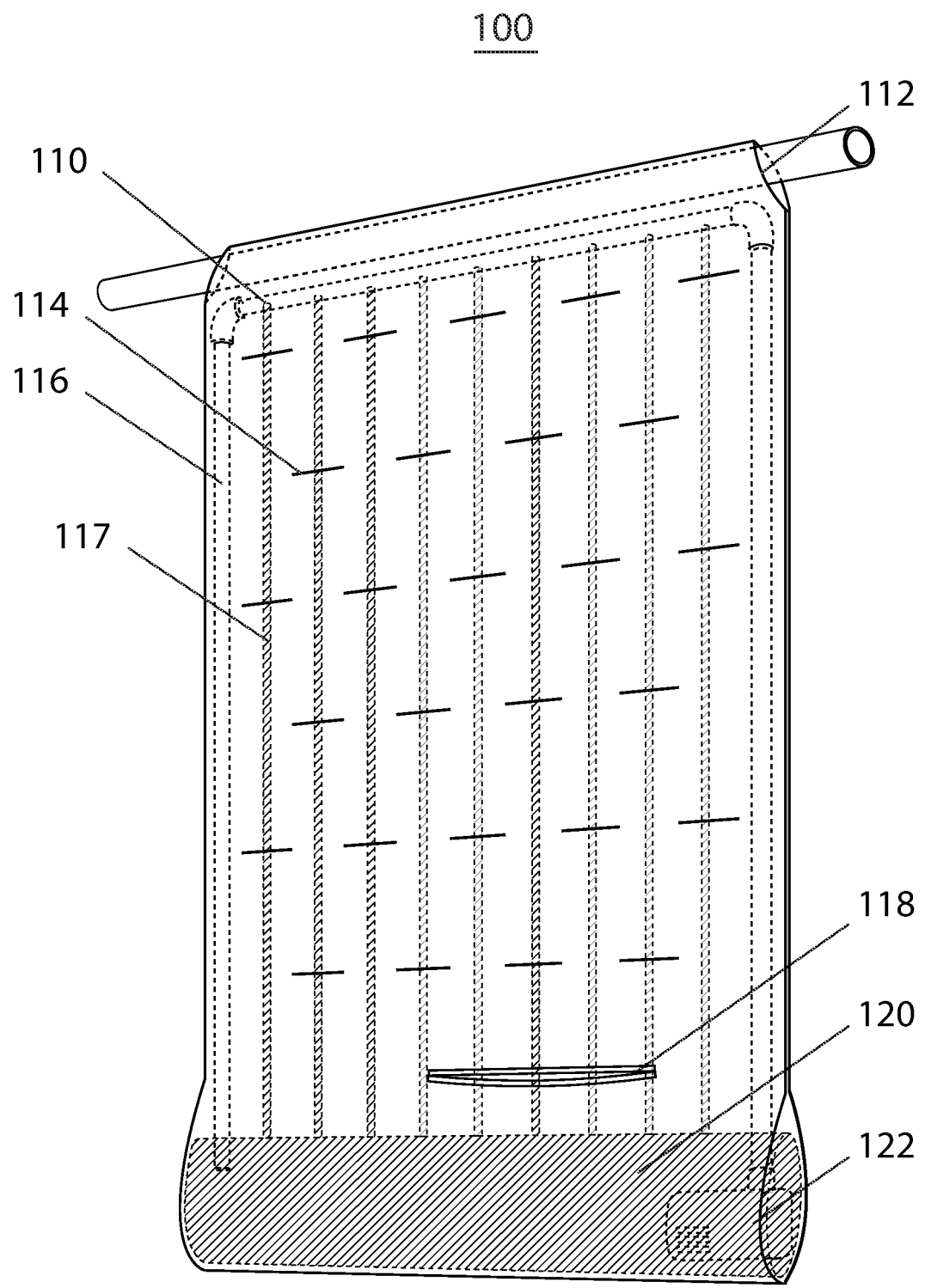
FIG. 2 is a front, perspective view of the system.

FIG. 2 shows the system in perspective view. Numbers indicate the same functions as described in FIG. 1.

Figure 3:
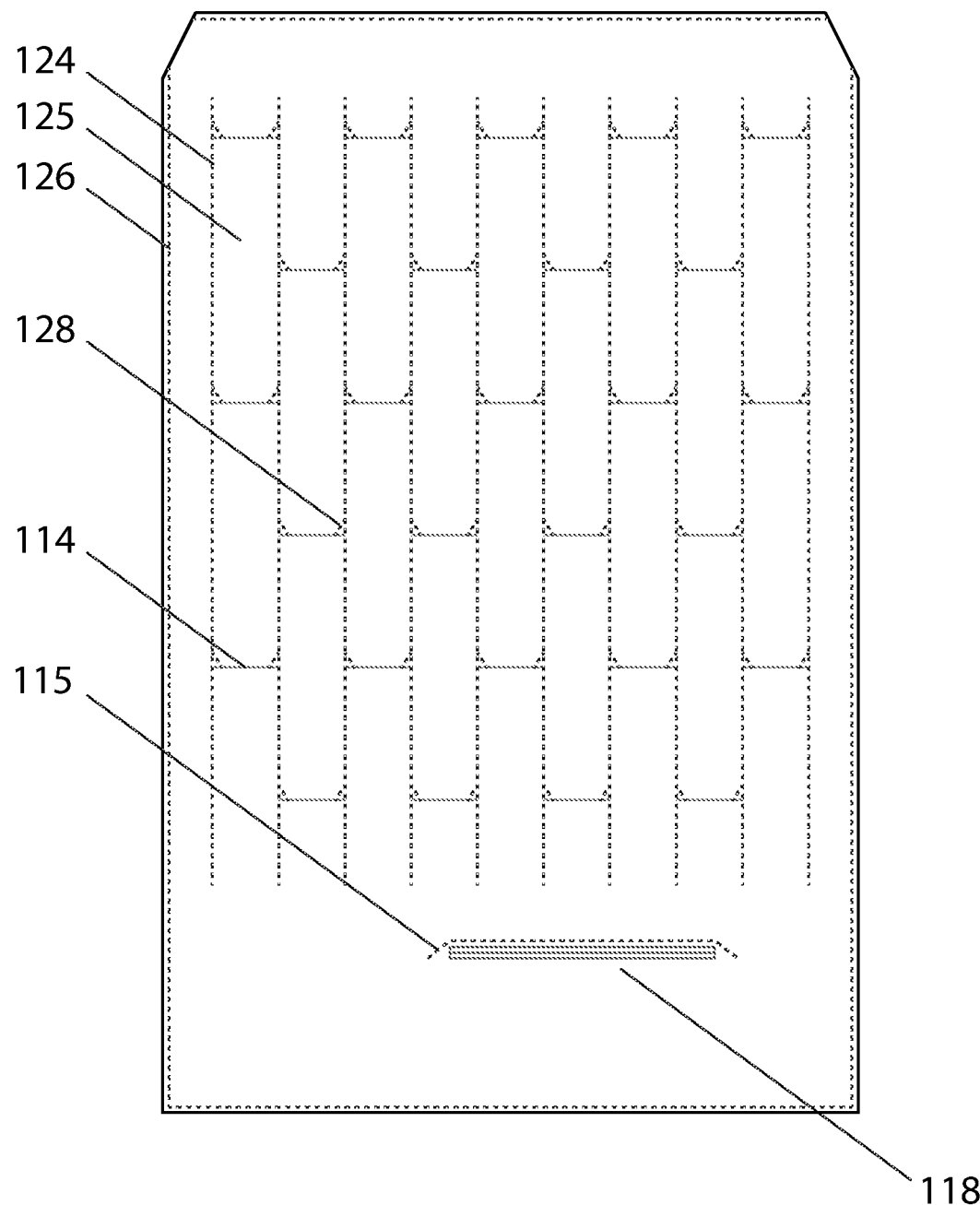
FIG. 3 is a front, orthographic view of the heat-seal pattern.

FIG. 3 shows an example heat-seal pattern, with dashed lines representing where the layers of material are sealed together. A seal 126 along the perimeter of the layers of material encloses the layers into a bag-like structure. Vertical seals 124 create vertical channels 125 that help distribute water throughout the system evenly. Small diagonal seals 128 direct water towards the centers of vertical channels 125, preventing the water from exiting the vertical channels 125. One skilled in the art understands that sealing patterns may vary, but all have the effect of distributing water evenly and preventing water from exiting the structure. Openings 114 are intended for plants to be inserted into the water channels 117 (FIG. 1). A horizontal seal 115 diverts water to the sides and away from the resealable opening 118.

This iteration holds 27 plants, but one skilled in the art understands this pattern may be altered to vary the size of the structure and number of openings 114 to grow anywhere from one to hundreds of plants.

Figure 4:
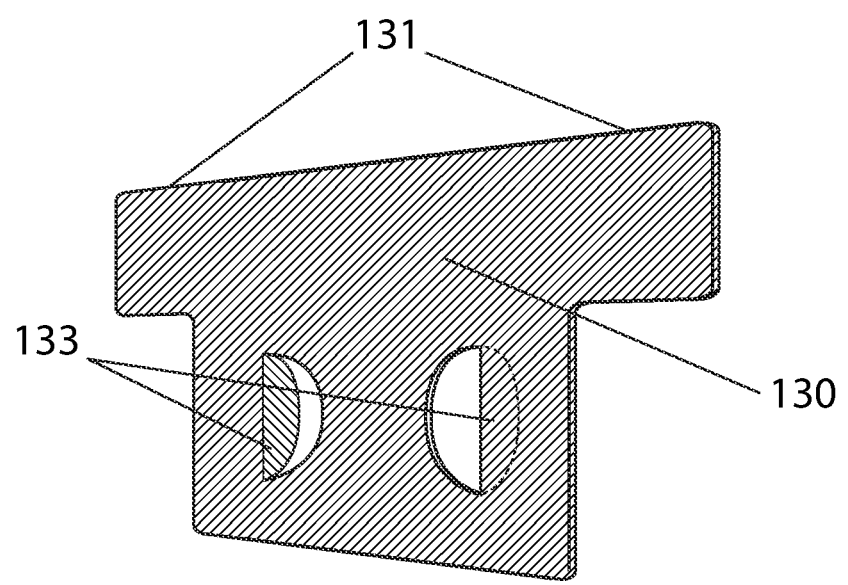
FIG. 4 is a front, perspective view of a plant holder.

FIG. 4 shows a detailed view of an example embodiment 100 of a plant holder 130, which provides leak prevention and support for plants that are inserted into the openings 114 (FIG. 3). The plant holder 130 is composed of a material that may be semi-rigid with extended tabs 131 and tabs 133. The extended tabs 131 prevent the plant holder 130 from falling into the vertical channels 125 (FIG. 3). Because the plant holder is placed between the front and rear membranes of the vertical channels 125 (FIG. 3), it serves to separate the membranes, which can adhere when wet. Adhesion of the membranes can cause leakage from the system because the adhesion backs up water flow in the vertical channel 125 (FIG. 3). By separating the front and rear membranes of the vertical channel, the plant holder helps prevent leakage.

Figure 5:
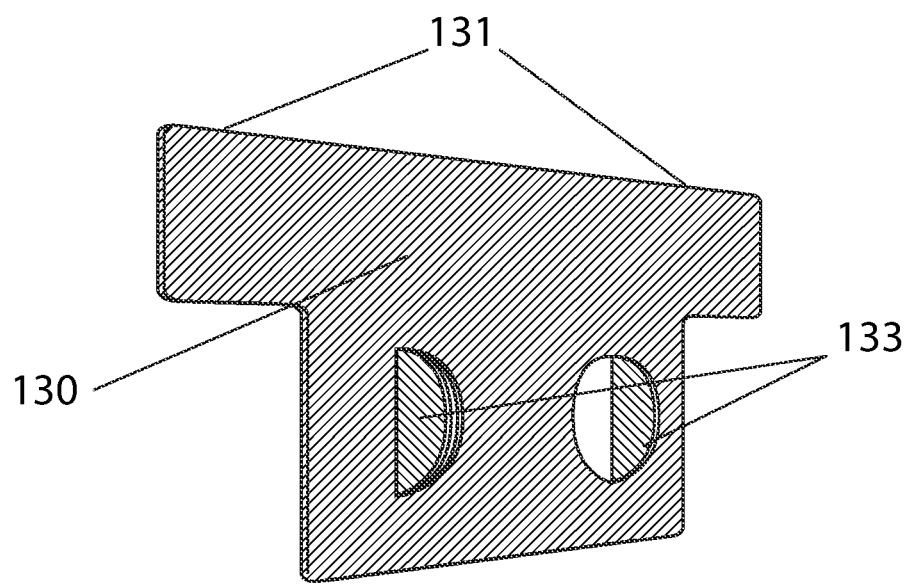
FIG. 5 is a back, perspective view of a plant holder.

FIG. 5 shows a detailed view of an example embodiment 100 of a plant holder 130 from the opposite angle. Numbers indicate the same functions as described in FIG. 4.

Figure 6:
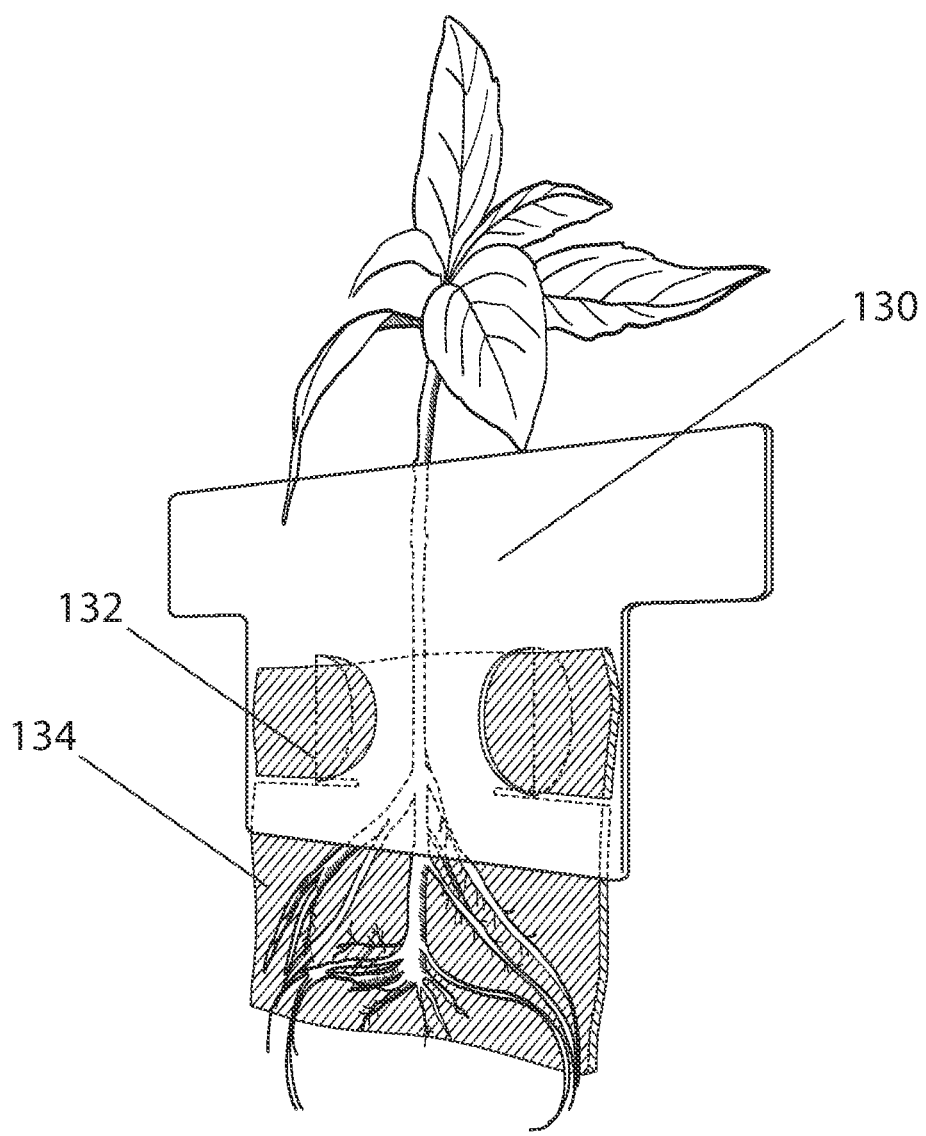
FIG. 6 is a front, perspective view of a plant holder with an inserted plant and growing medium.

FIG. 6, 100 shows the plant holder 130 with growing medium 134 and a provided plant inserted as intended. The plant holder 130 is designed to hold a piece of growing medium 134 in the vertical channel 125 (FIG. 3). The growing medium can be placed into the plant holder via opening 132 in the plant holder. The growing medium 134 spans the width of the vertical water channel and helps distribute moisture to the plant roots as it wicks the water by capillary action. The growing medium 134 adds support for the plant roots and also may be used to hold seeds. One skilled in the art understands there are various ways to support a plant in an opening in a channel, as well as various ways to hold a growing medium against this support.

Figure 7:
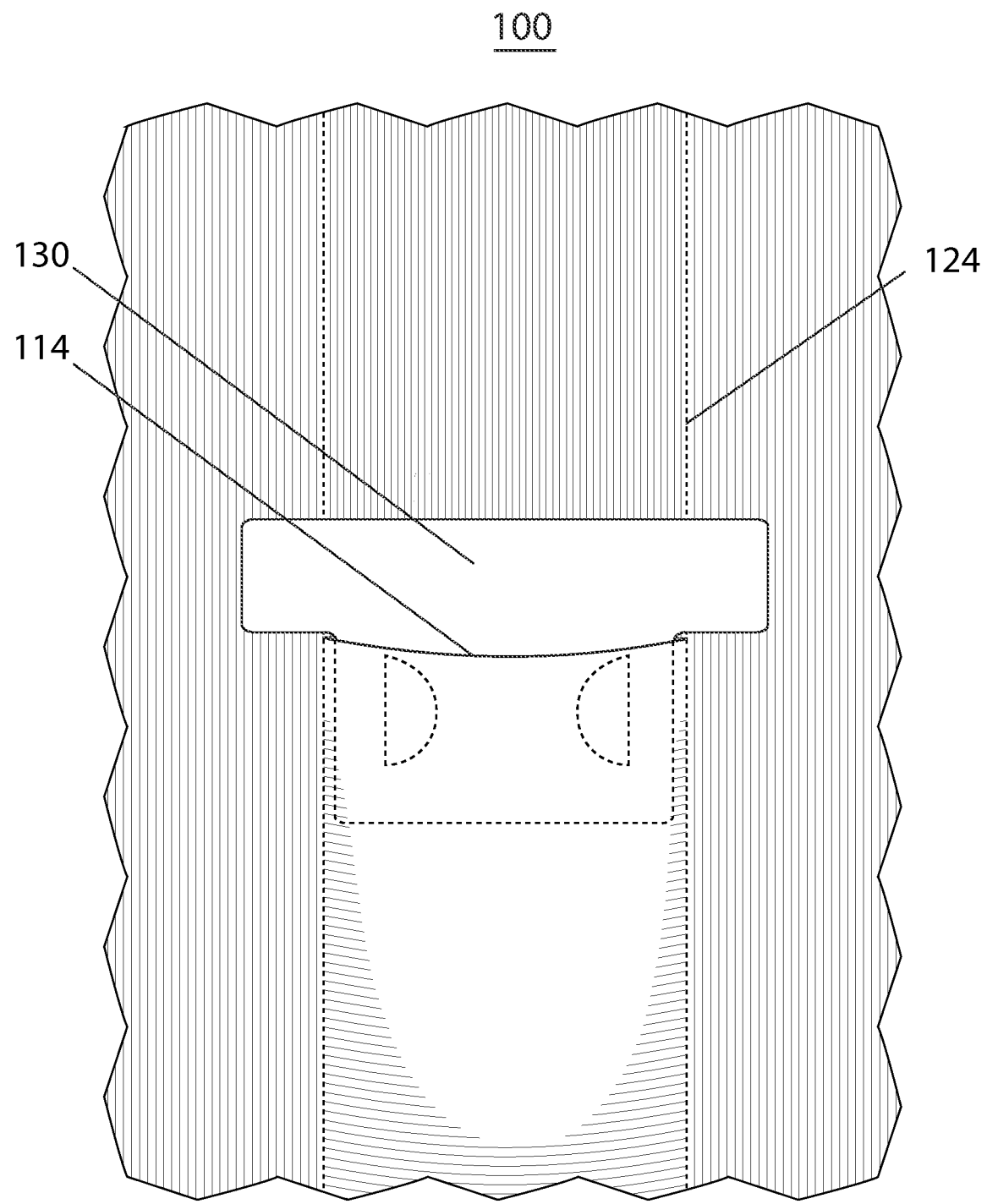
FIG. 7 is a detailed view of one of the openings in a vertical channel.

FIG. 7 is a detailed view of a single opening 114 in the embodiment. The vertical heat seals 124 create channels 125 (FIG. 3) for the water to flow through. The heat seals are positioned to surround plant holders 130 and hold them in place.

Figure 8:
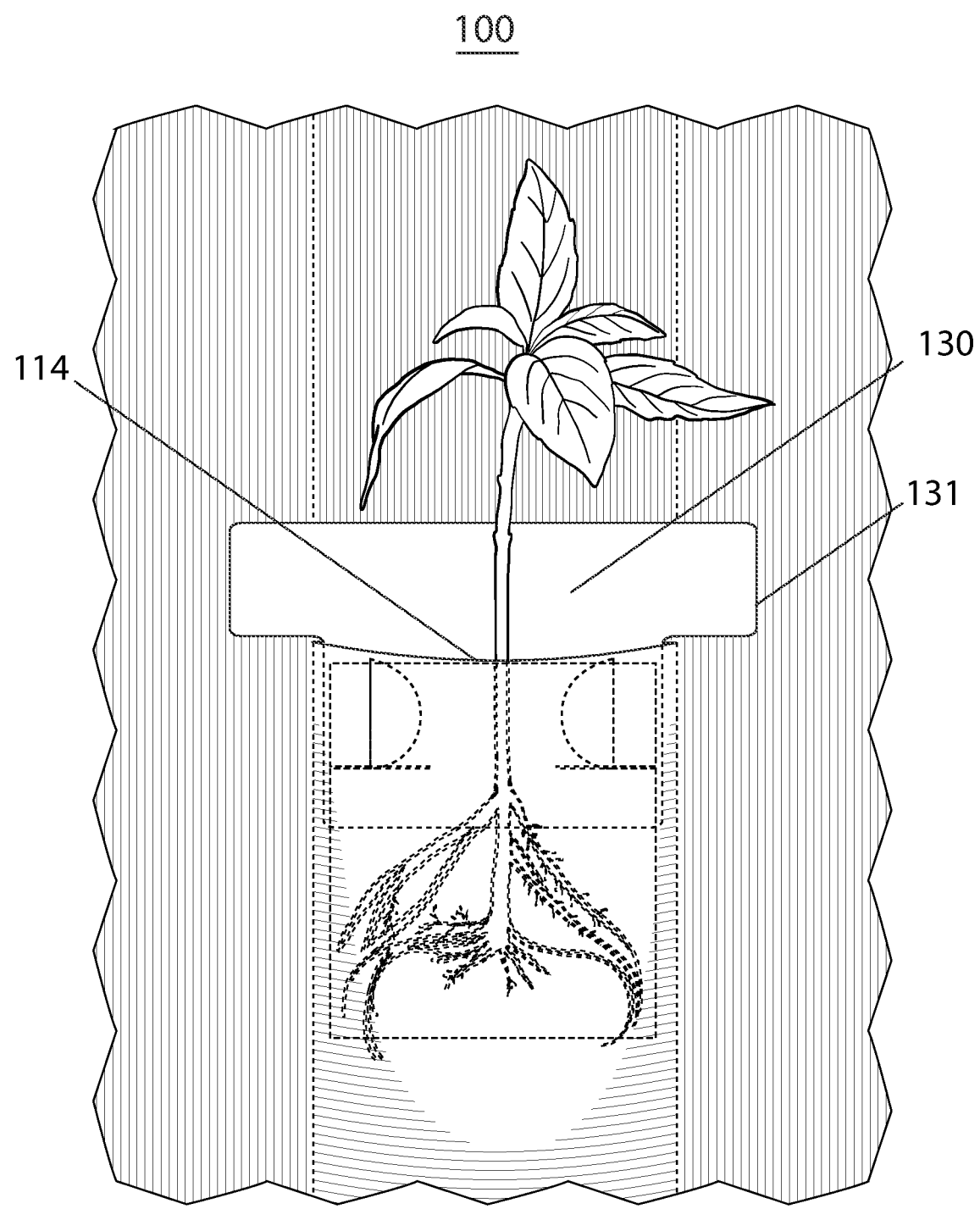
FIG. 8 is a detailed view of a plant inserted into an opening made in a vertical channel.

FIG. 8 is a detailed view of a provided plant inserted in an opening 114 as intended. In use, the plant is inserted into the plant holder 130 via opening 132 (FIG. 6) in the plant holder, and the plant holder is then inserted into opening 114 of the system. Extended tabs 131 contact the top of the opening 114 and prevent the plant holder 130 from falling into the vertical channel 125 (FIG. 3).

Figure 9:
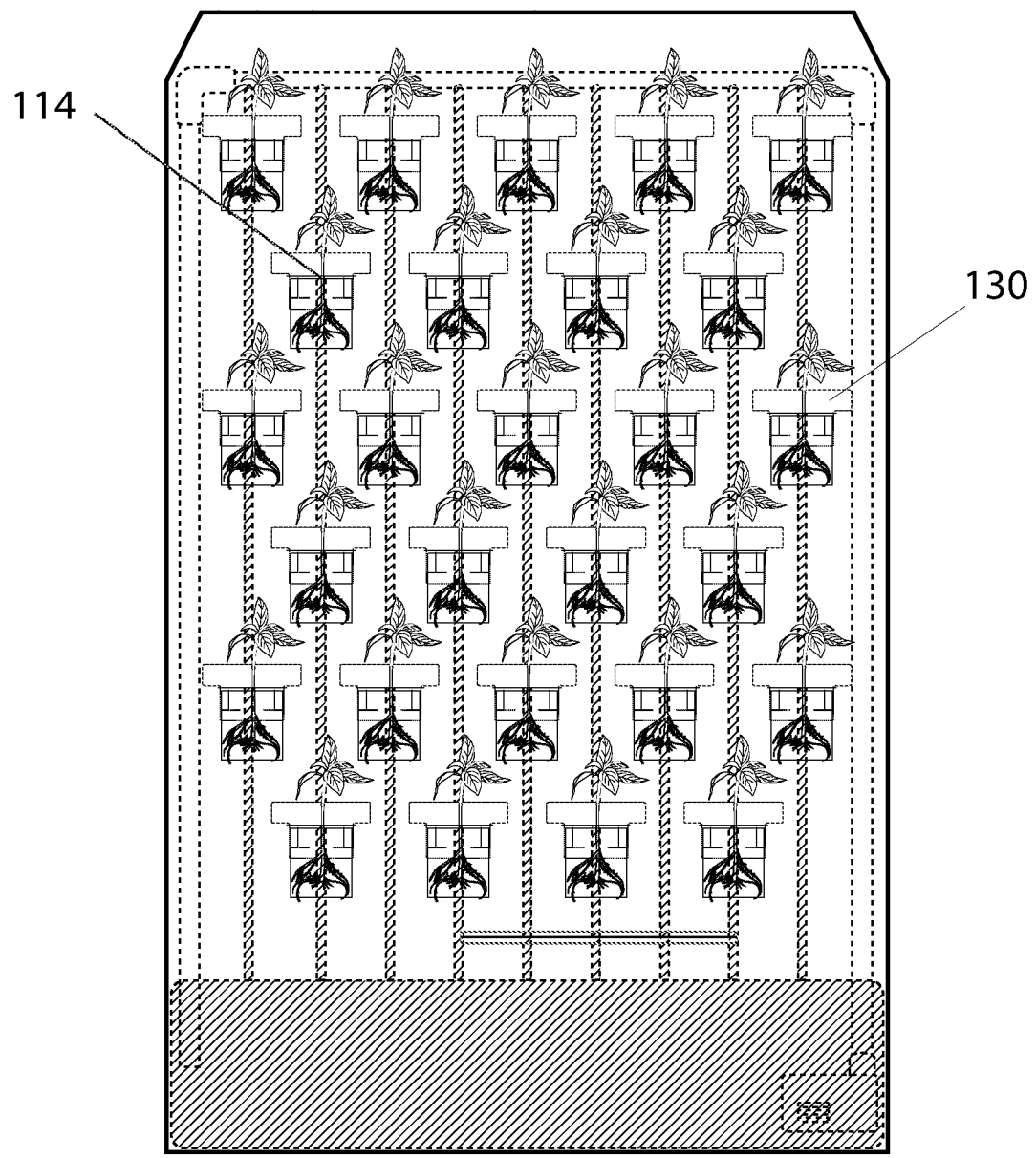
FIG. 9 is a front, orthographic view of the system with plants in plant holders.

FIG. 9 is a front orthographic view of the system with provided plants in plant holders 130 inserted into the openings 114.

Figure 10:
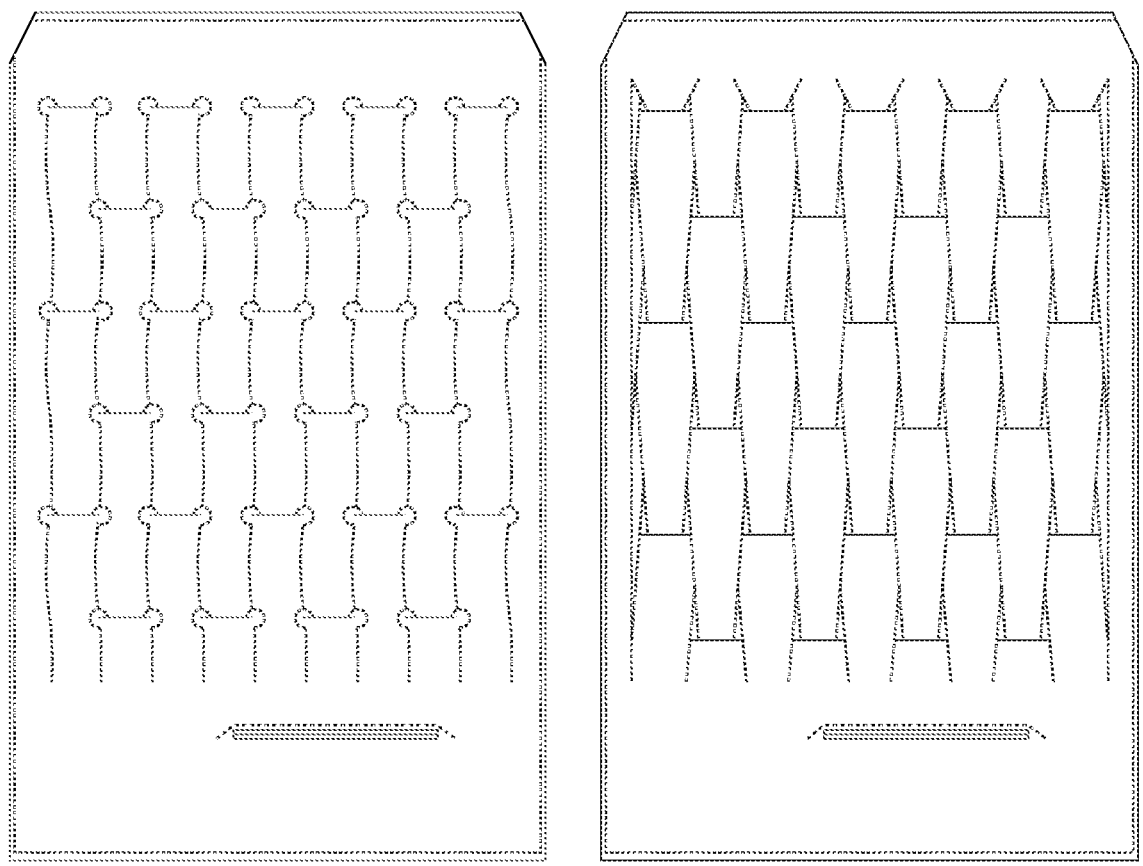
FIG. 10 shows various heat-seal patterns.

FIG. 10 shows two examples of heat-seal patterns. One skilled in the art understands that there are many variations of heat-seal patterns that can achieve similar results.

Figure 11:
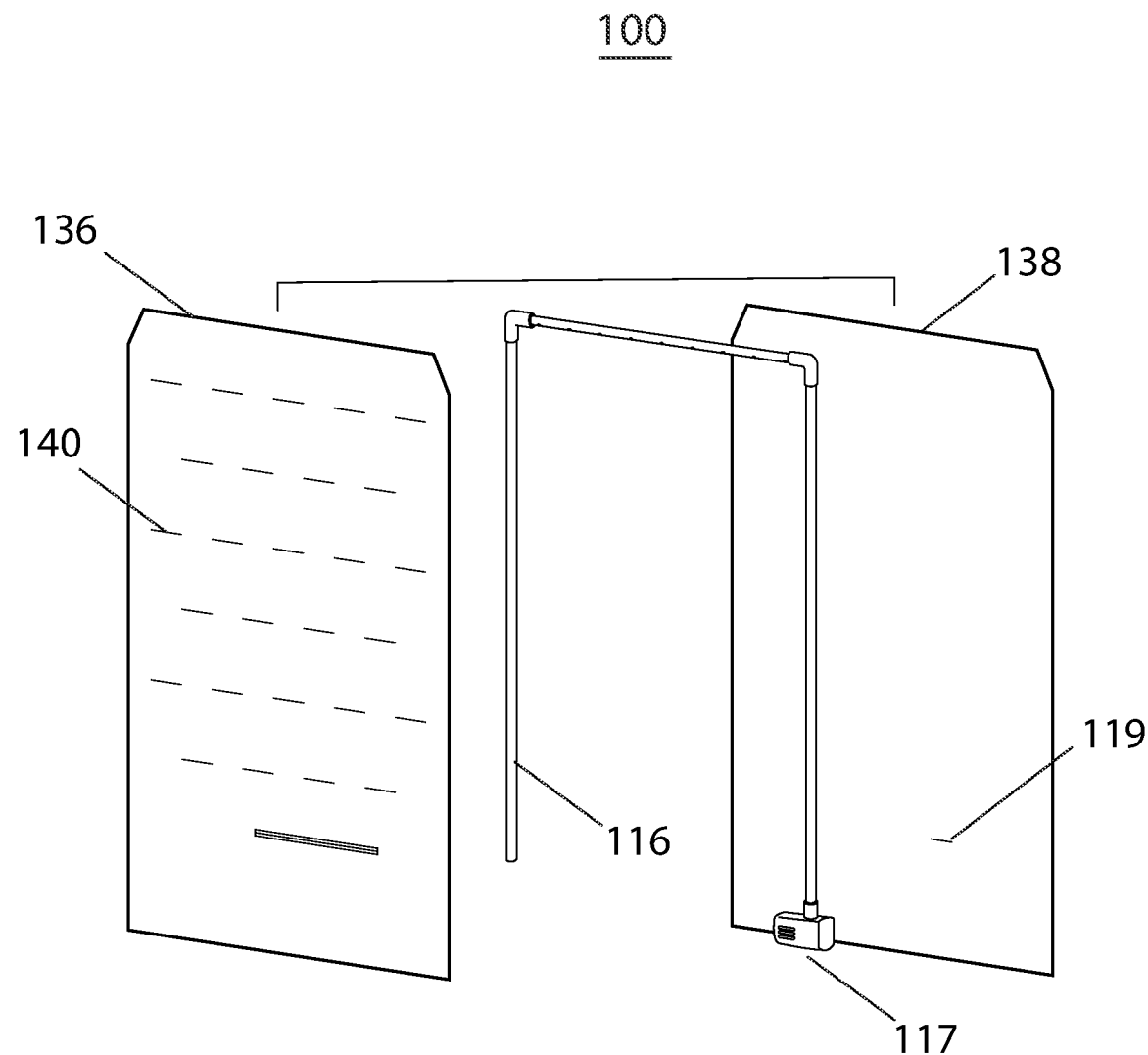
FIG. 11 shows an exploded view of the system.

FIG. 11 is an exploded view of the system. A front layer of material 136 is sealed to a back layer 138. These layers can be made of any plastic films or waterproof fabrics. The duct system 116 can be sealed into the system or inserted at a later point. A slit 119 in the back layer is an opening for the pump's 117 electrical cord. One skilled in the art understands that, beyond heat-sealing, there are various ways to seal together waterproof layers of material.

Figure 12:
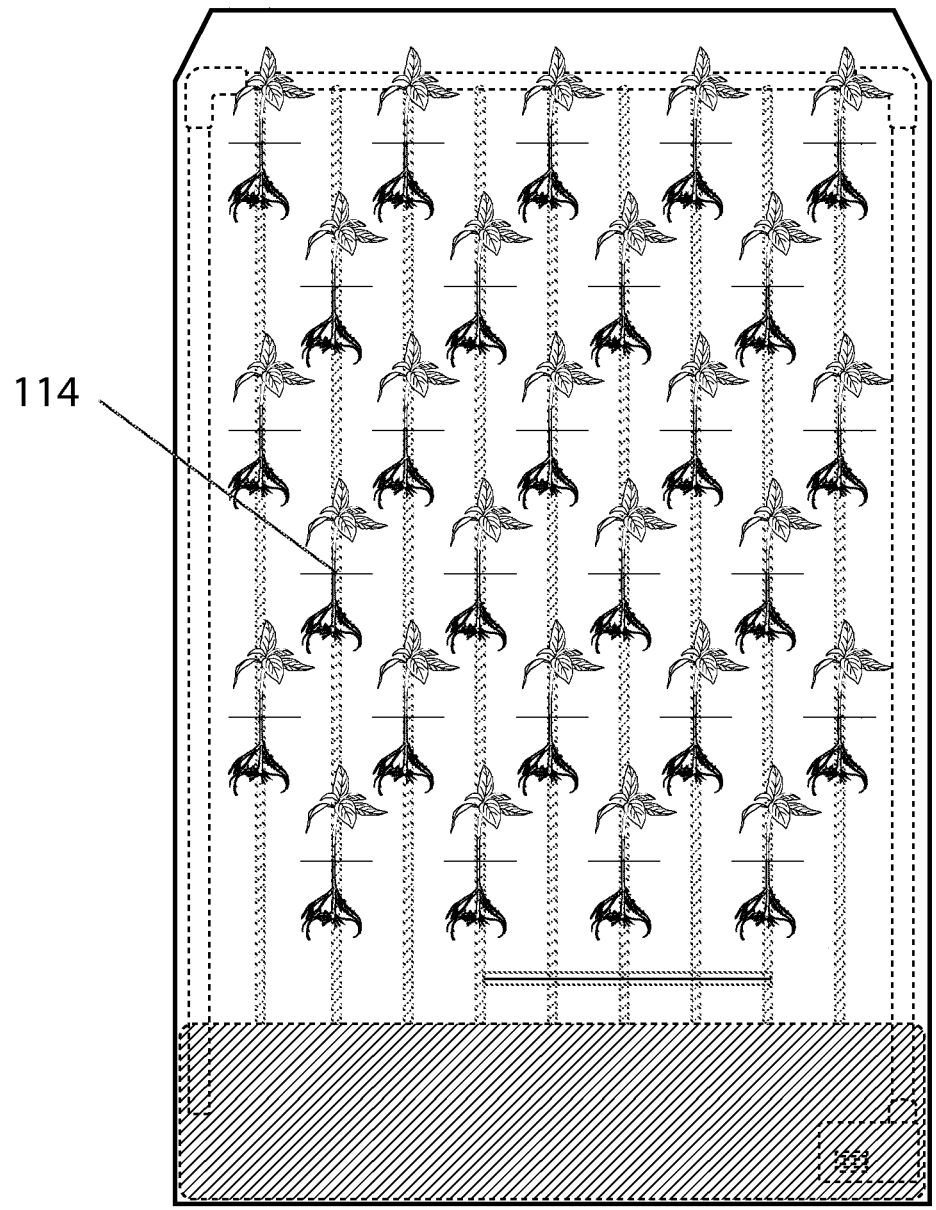
FIG. 12 is a front, orthographic view of the system without plant holders.

FIG. 12 is a front, orthographic view of the system without plant holders. In this and other iterations, plants may be inserted into openings 114 without the use of a plant holder 130 (FIG. 9). This embodiment functions with starter plants rather than seeds.

Figure 13:
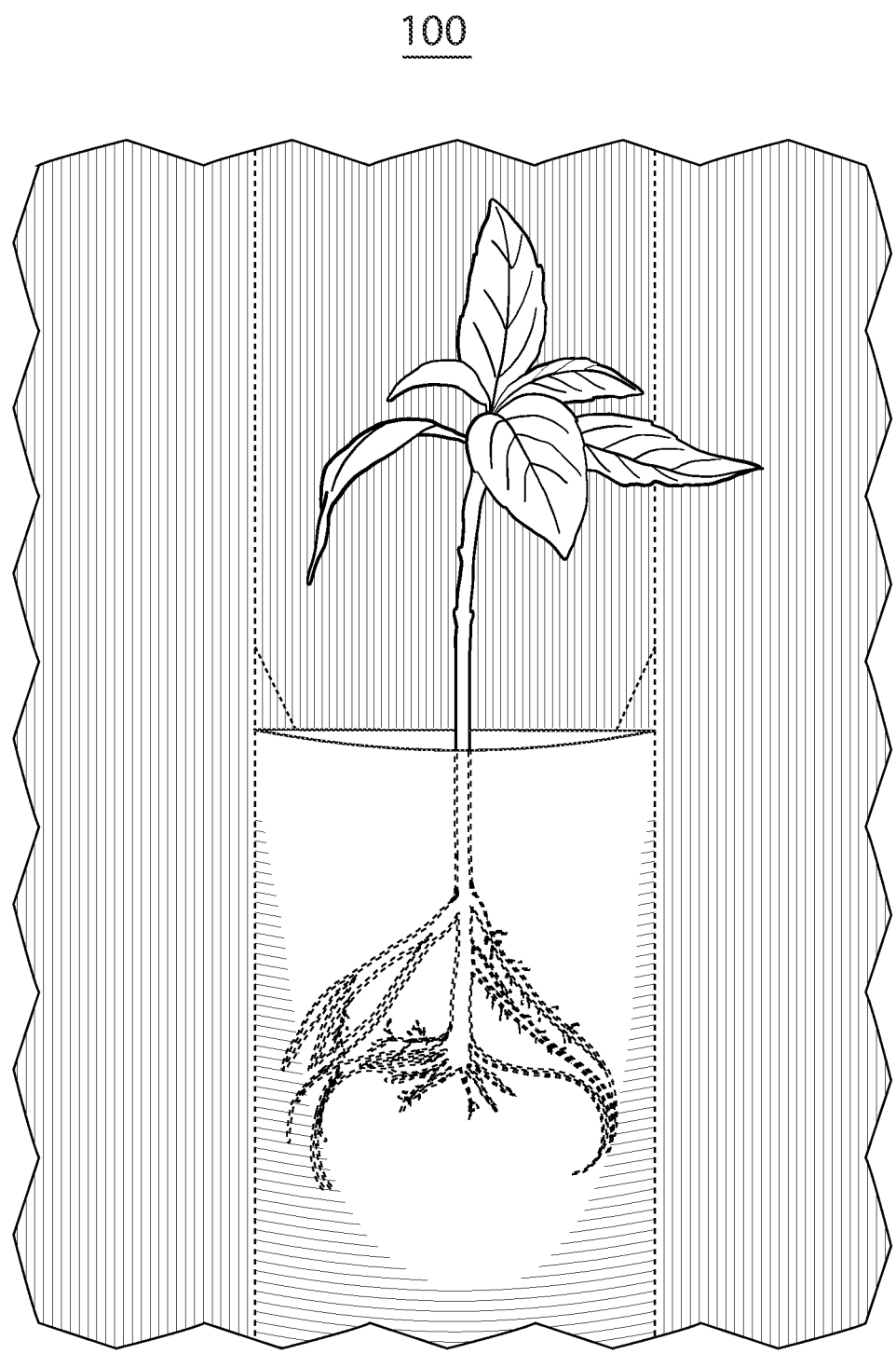
FIG. 13 is a detailed view of a plant inserted without a plant holder in an opening made in a vertical channel.

In FIG. 13 a provided plant is inserted into an opening without the use of a plant insert.

Figure 14:
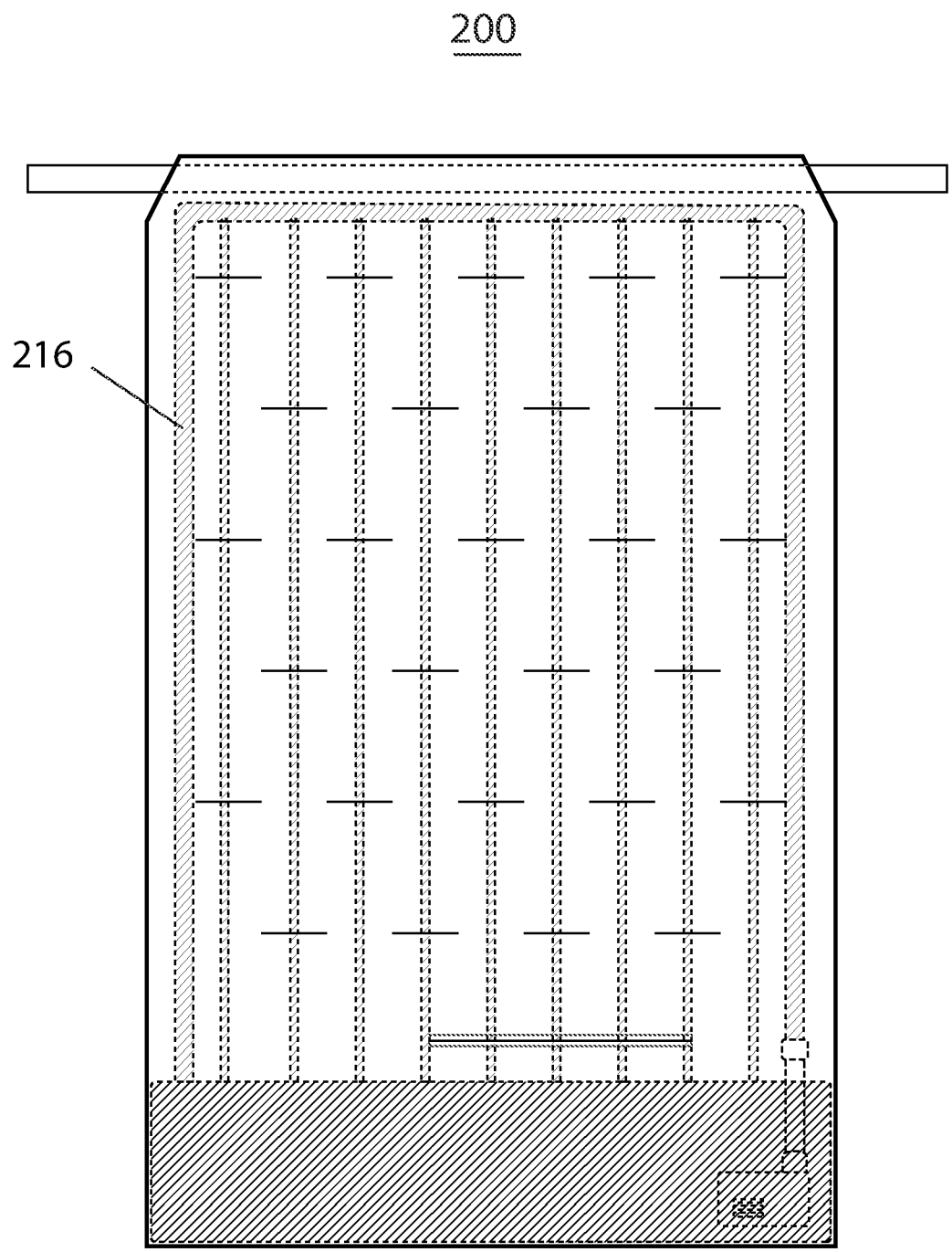
FIG. 14 is a front, orthographic view of a second iteration of the system.

FIG. 14 shows a second iteration 200 of the system, with heat-sealed ducts. In this iteration the duct system 216 is created by the heat-seal pattern instead of an inserted subsystem of rigid ducts. Parts are the same as those in FIG. 1.

Figure 15:
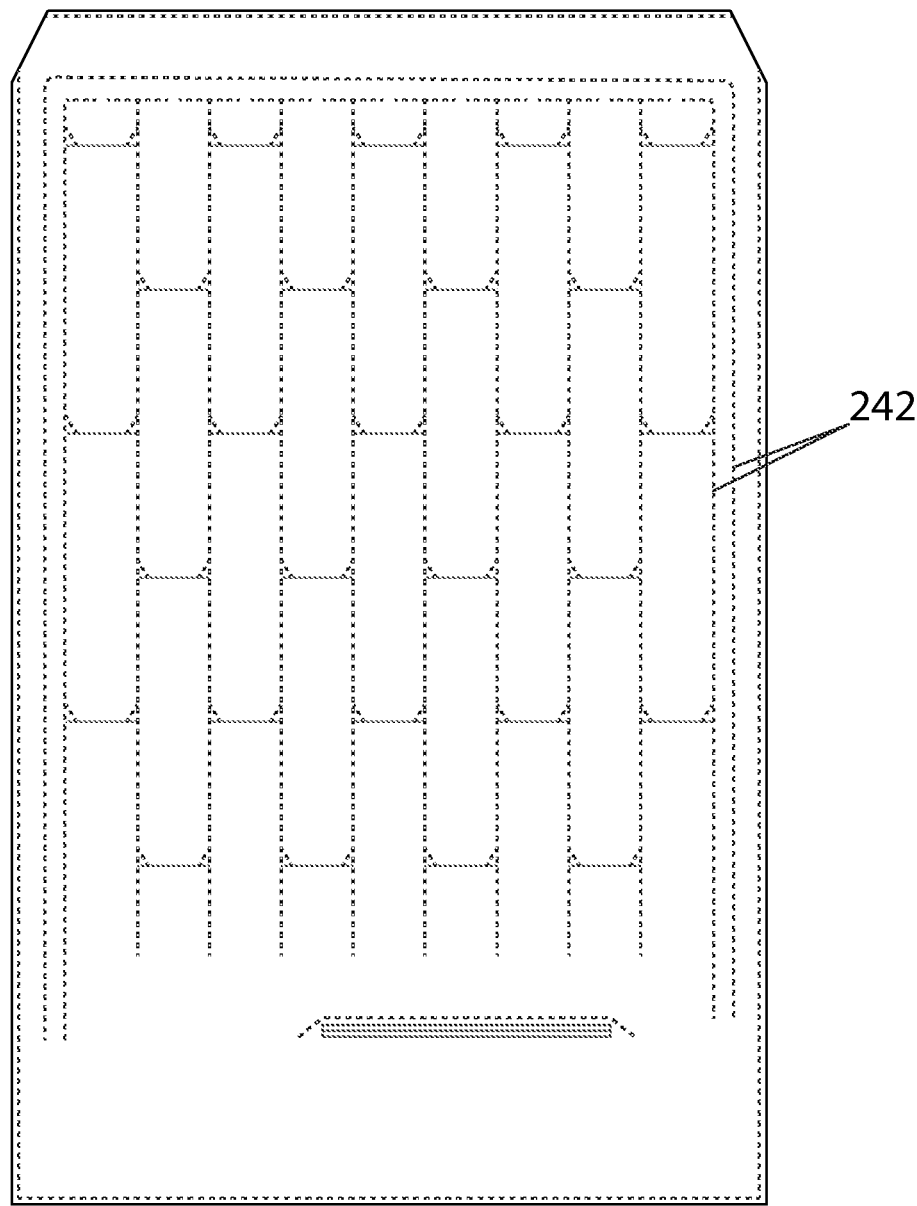
FIG. 15 is a front, orthographic view of a variation of a heat-seal pattern.

FIG. 15 shows the iteration 200 with heat-sealed ducts. Parallel seals 242 create a duct between the layers of the system's material.

Figure 16:
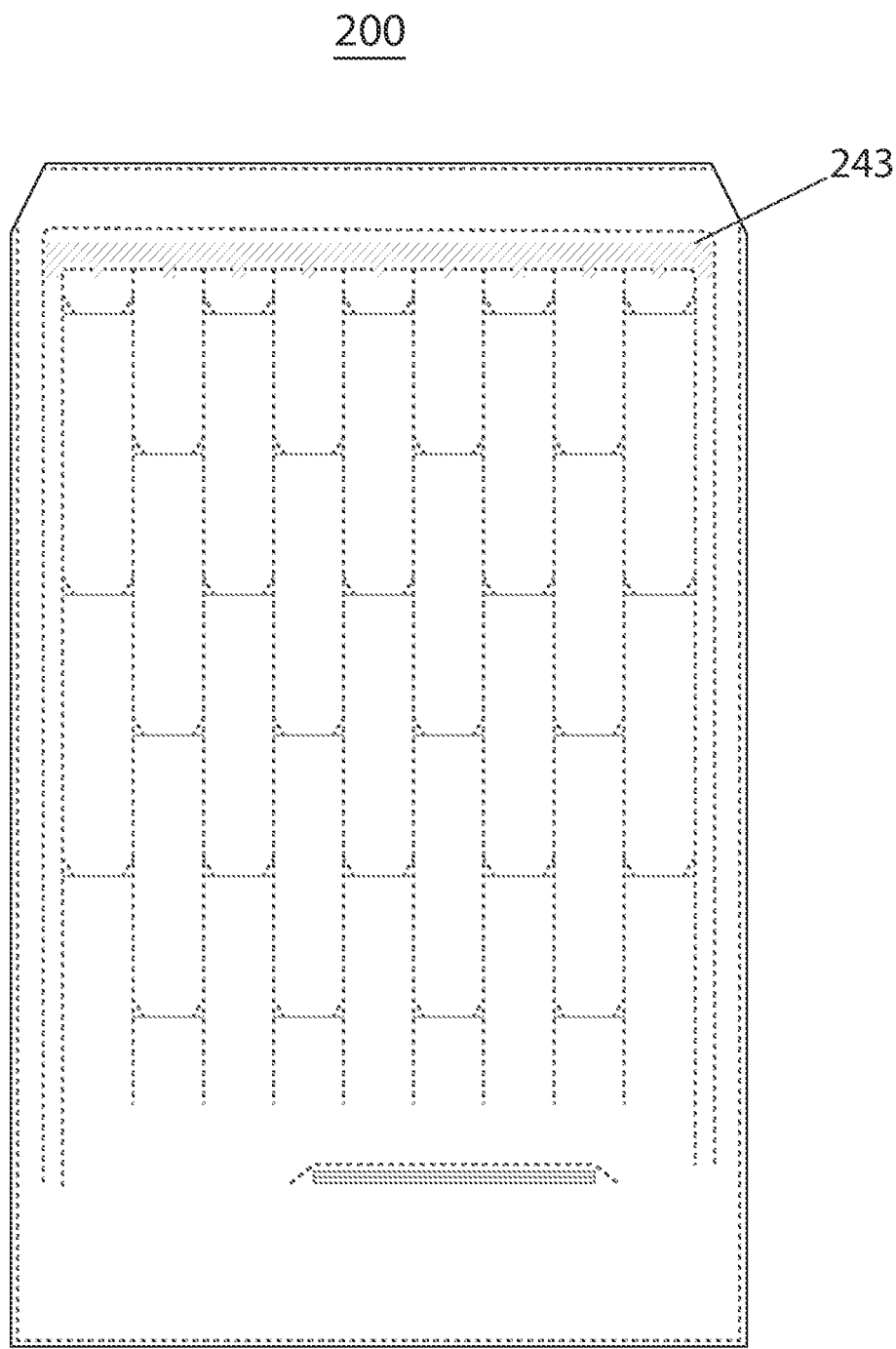
FIG. 16 is an orthographic view of another iteration of the system.

FIG. 16 the iteration 200 with a varying heat-seal pattern and a planar barrier 243 that is inserted between the embodiment's layers. The barrier 243 separates the duct system's front and rear membranes. The exit ports 110 (FIG. 1) of the ducting would otherwise be blocked by the swelling of adjacent ducts as they fill with water during the pumping process. The barrier serves to keep the exits 110 (FIG. 1) separated from those ducts and open.

Figure 17:
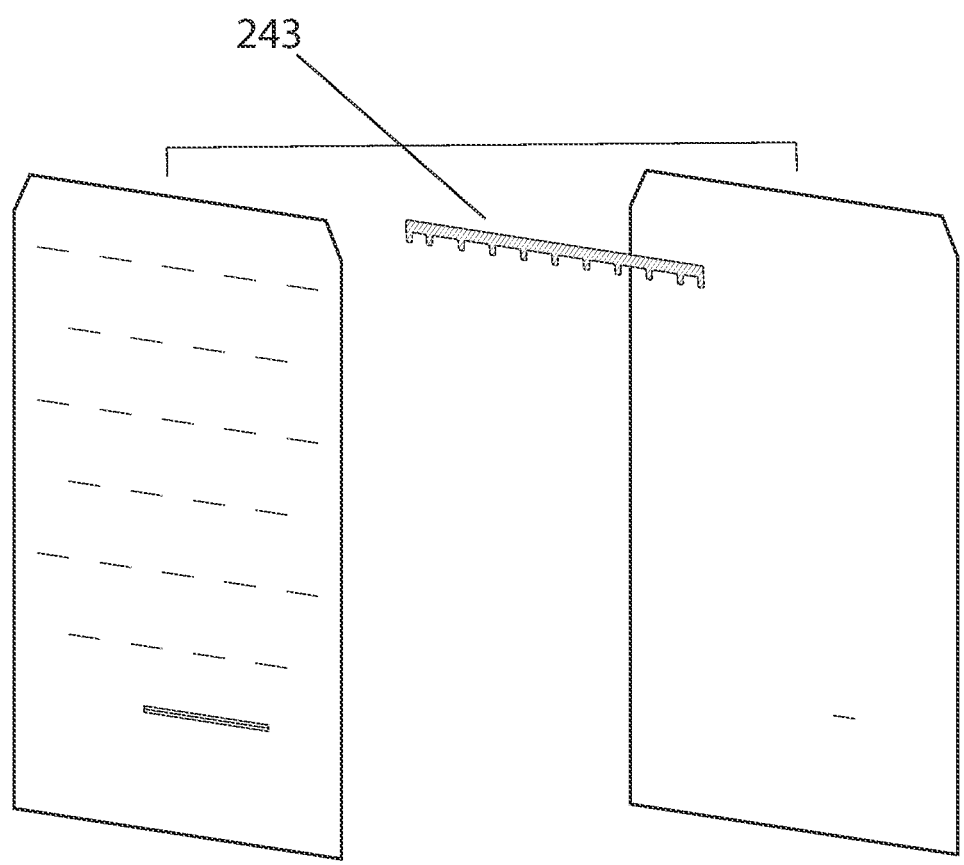
FIG. 17 is an exploded view of the same iteration.

In FIG. 17 the planar barrier 243 is shown in exploded, perspective view.

Figure 18:
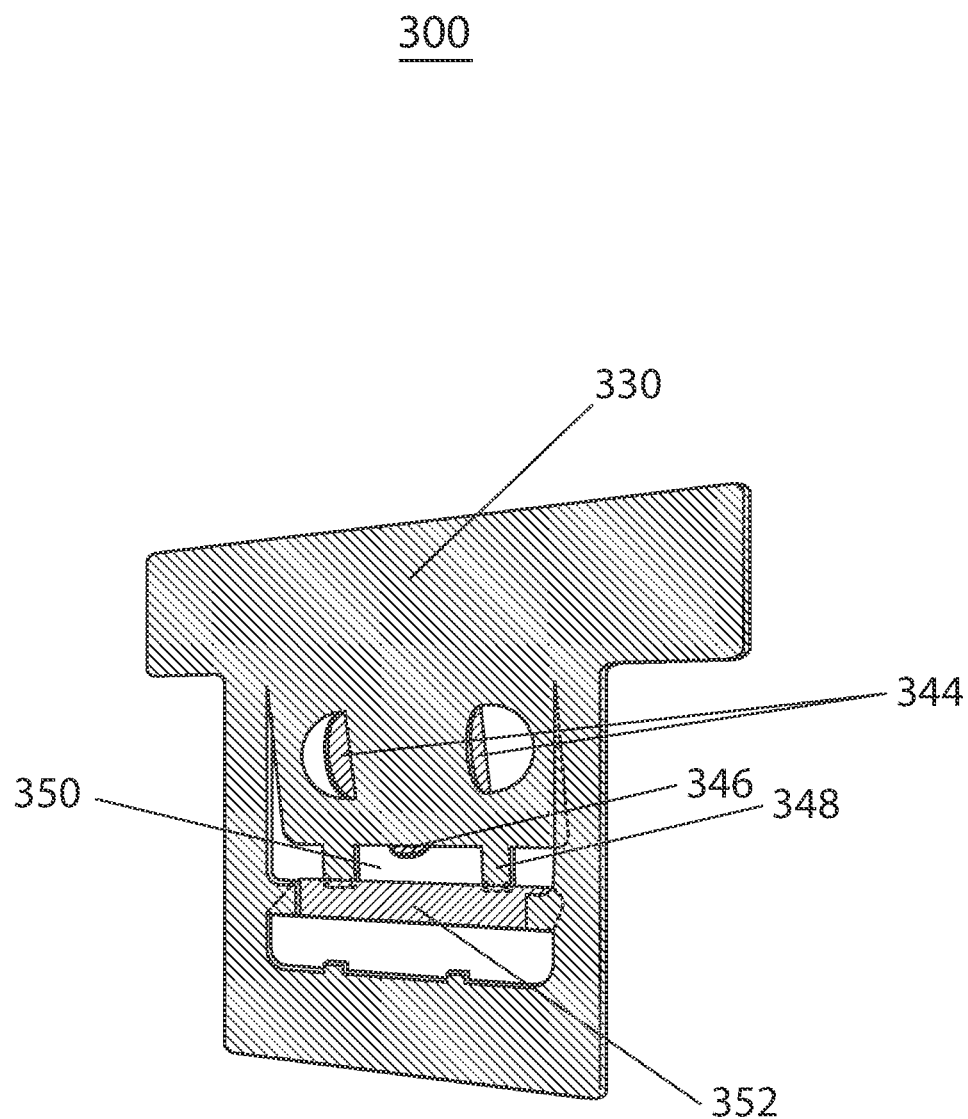
FIG. 18 is a perspective view of an iteration of a plant holder.

FIG. 18 shows a second iteration 300 of a plant holder 330 that keeps the plant's base, as well as the grow medium 354 (FIG. 19) out of the water stream. Flaps 344 and 346 press on the growing medium to properly position and secure it against the plant holder 330. Another flap 352 provides a conduit to bring water to the plant's lower roots. It directs water from its normal flow behind the plant holder 330, through an opening 350 in the plant holder 330, and toward the plant's roots. Yet another set of flaps 348 interlock with flap 352 to hold flap 352 at an acute angle. Flaps 348 also serve to prevent flap 352 from catching on the underside of openings 314 (FIG. 1). One skilled in the art understands that various interlocking features may be employed here.

Figure 19:
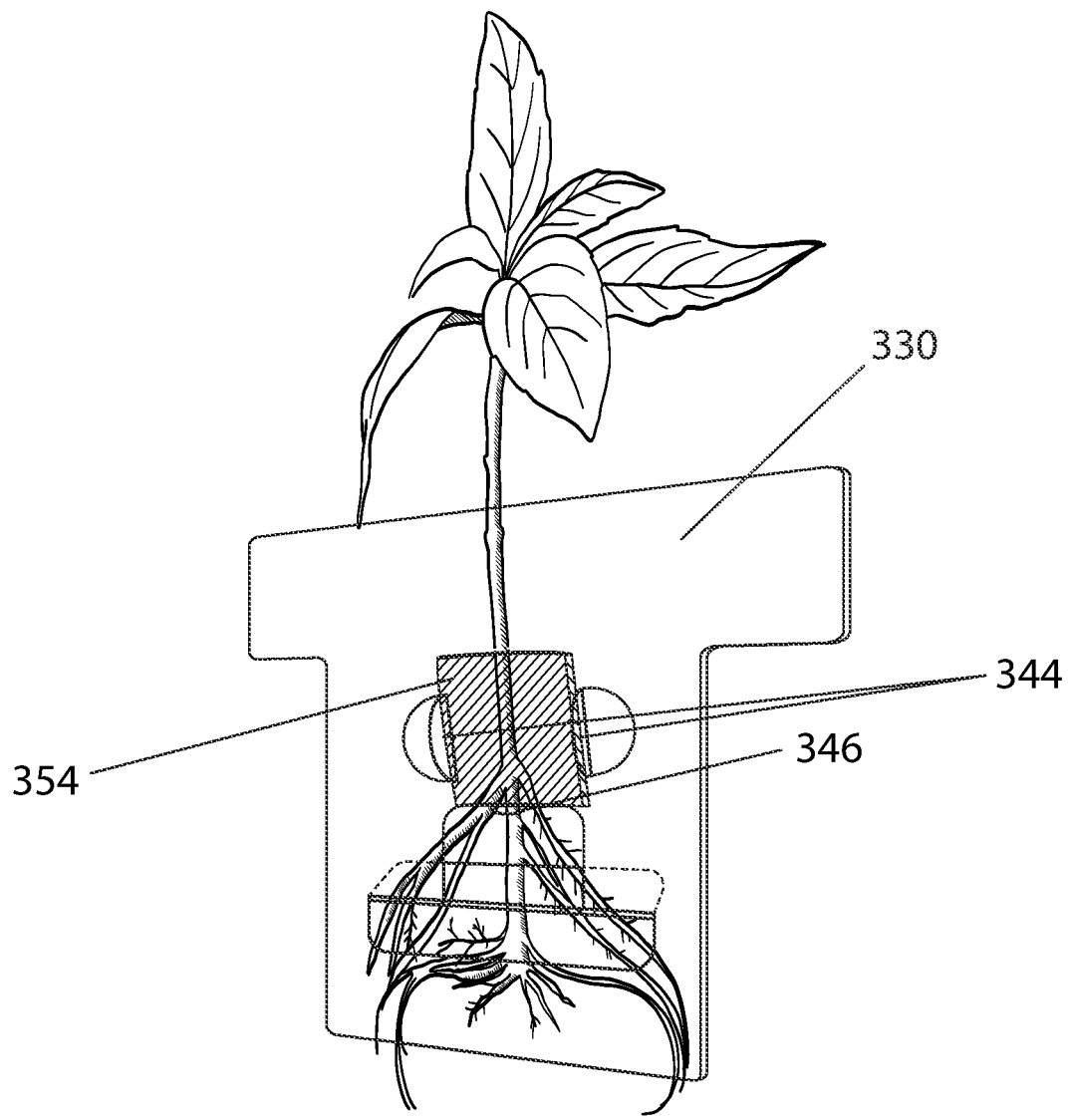
FIG. 19 is a perspective view of an iteration of a plant holder with a provided plant.

FIG. 19 shows a plant holder 300 with a provided plant inserted as intended. The plant is held in place behind a piece of growing medium 354. The growing medium, which is oriented on the front side of the plant holder, is a vestige of the germination process and remains integrated into the plant that grew from it. It is separated from the system's water source by the barrier formed by the plant holder. Flaps 344 help hold the growing medium in place and separate the system's front and rear membranes to prevent the membranes from adhering, which could result in water buildup or leakage. Flap 346 positions the growing medium and the plant in the plant holder.

Figure 20:
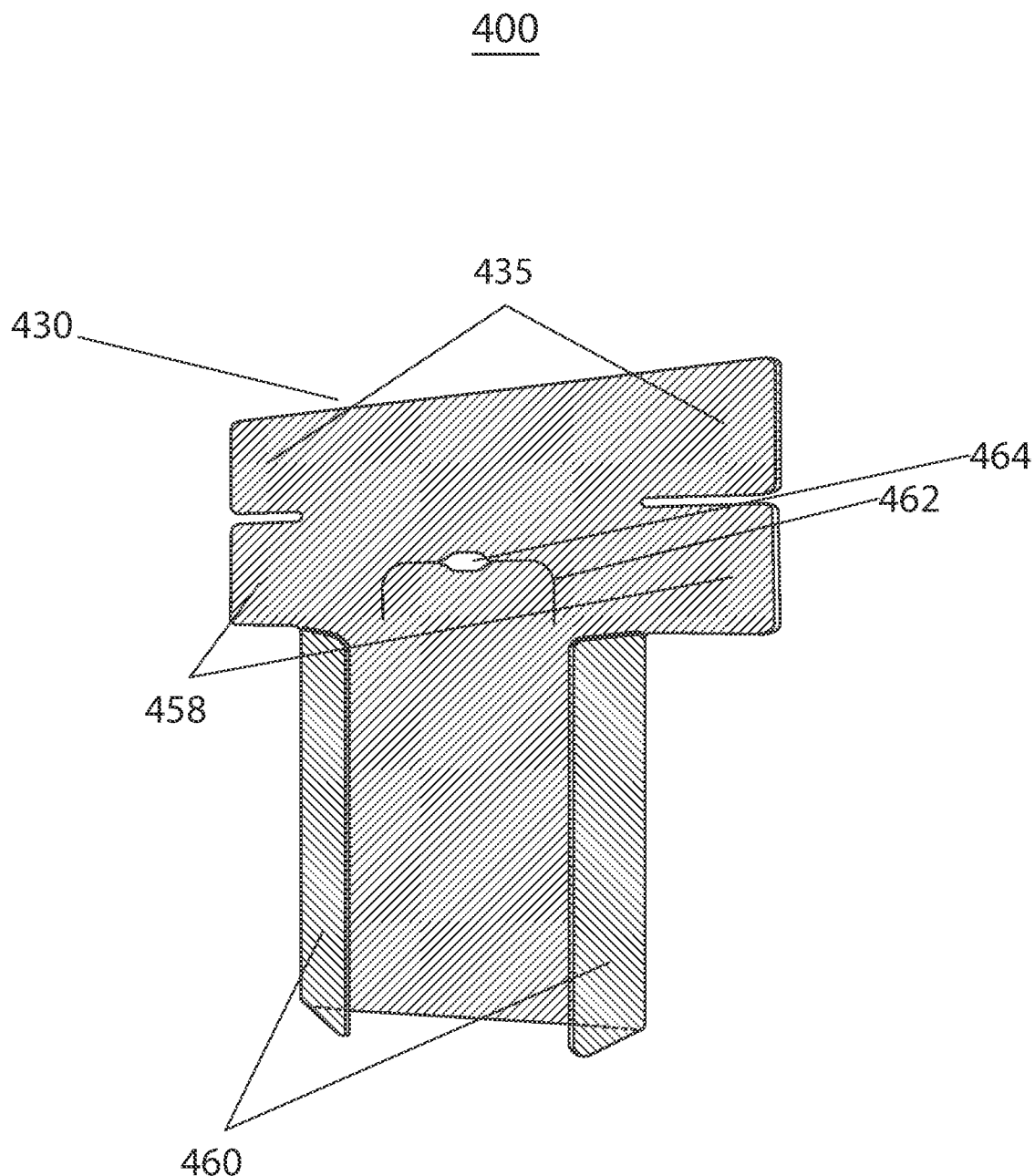
FIG. 20 is a perspective view of another iteration of a plant holder.

FIG. 20 shows a third iteration 400 of the plant holder with upper tabs 435 that prevent the plant holder from dropping into the vertical channels 125 (FIG. 3). Lower tabs 458 may be folded inward to allow the plant holder to sit lower in the vertical channels. By folding or unfolding these tabs the plant may be lowered into the water streams 417 (FIG. 1), or raised higher in the water streams as needed. One skilled in the art understands adjustable flaps can be configured in various ways.

Figure 21:
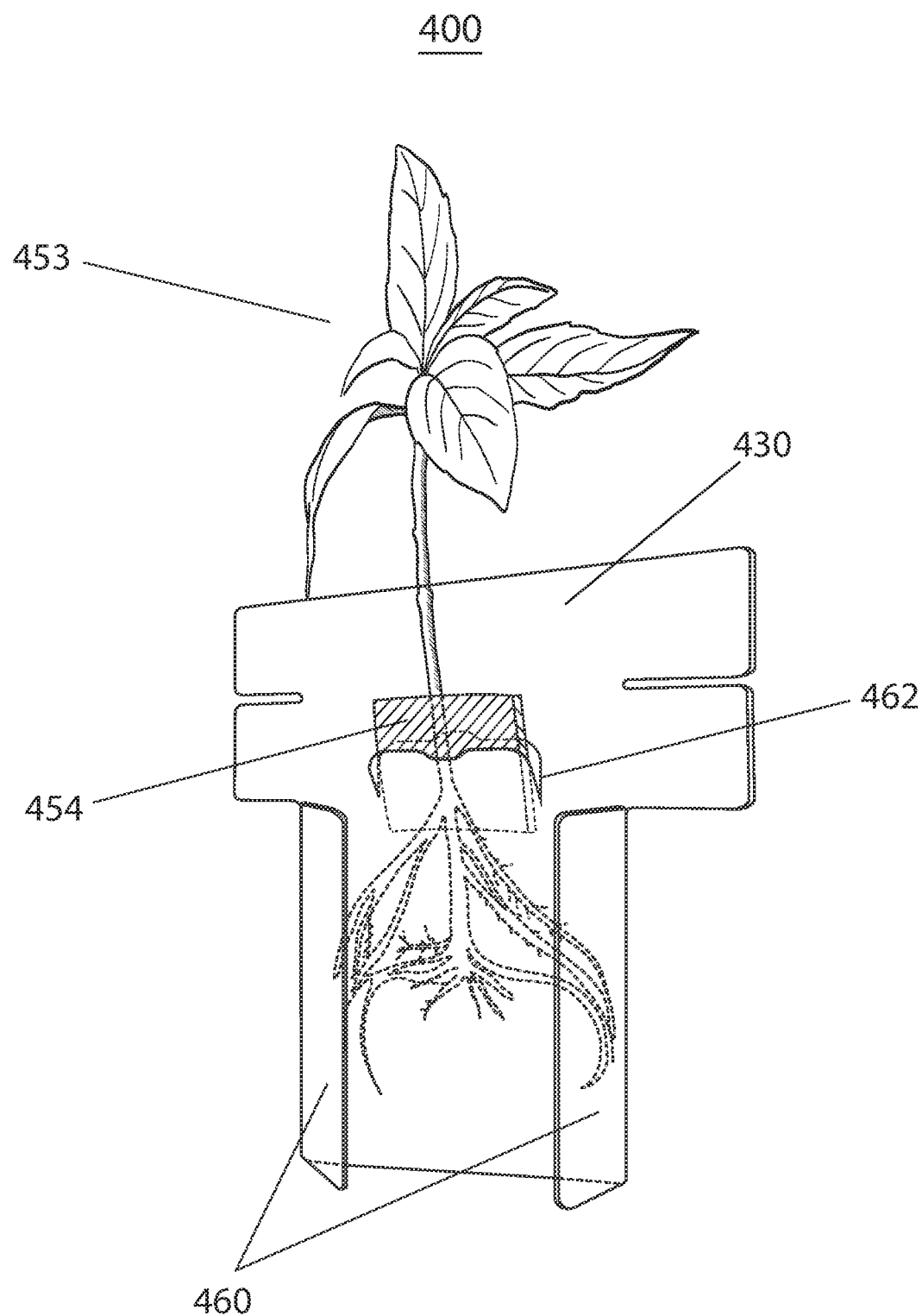
FIG. 21 is a perspective view of a plant holder with a provided plant.

FIG. 21 shows a provided plant 453 and growing medium 454 as it is held against the plant holder 430 in opening 462. A plant or growing medium 454 may be partially inserted into an opening 462 in the plant holder 430. An opening 464 (FIG. 20) is sized to prevent pinching of the plant or growing medium. Flaps 460 increase the depth of the plant holder, adding tension to hold the plant holder in the vertical channels 125 (FIG. 3).

Figure 22:
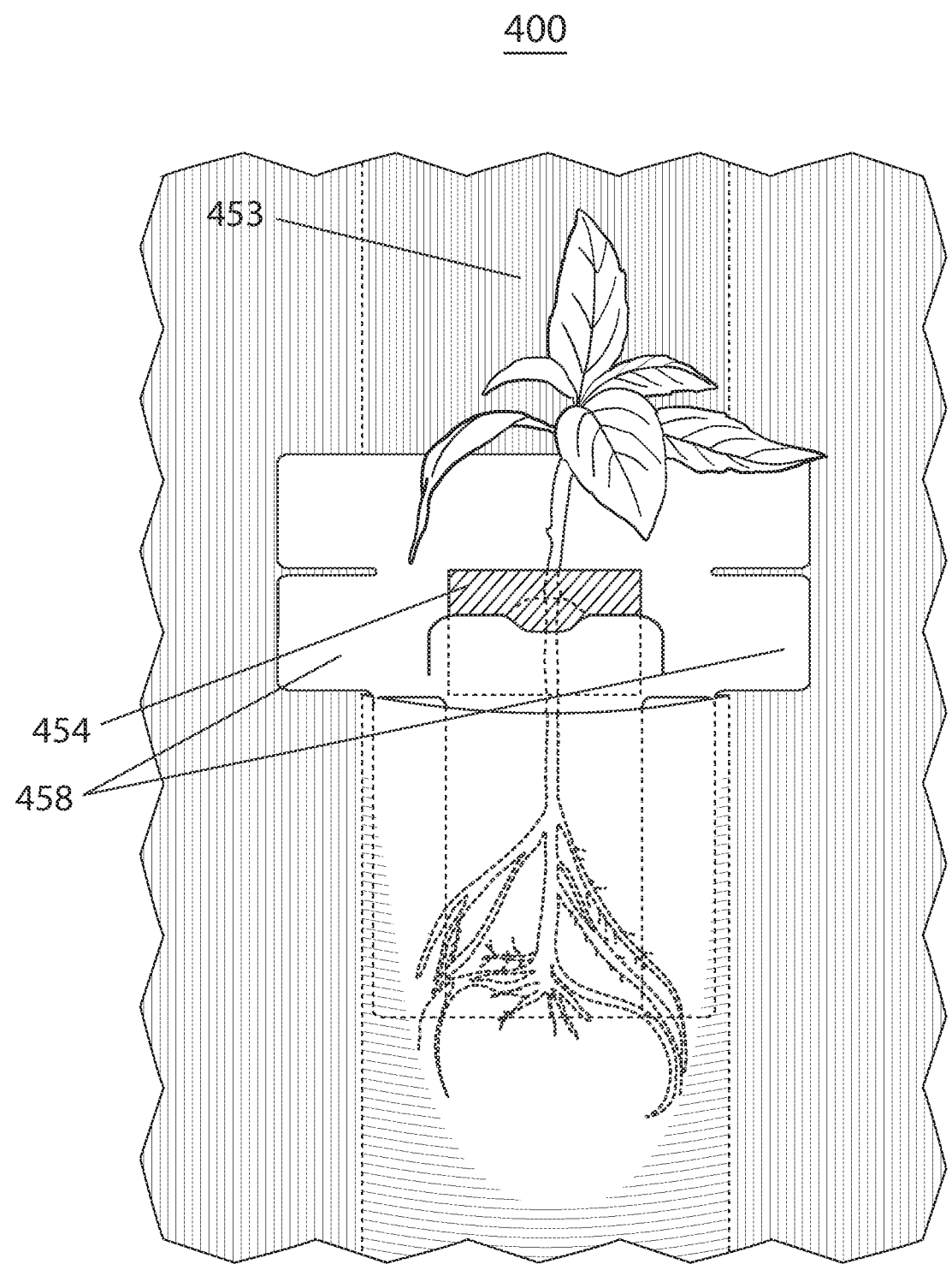
FIG. 22 is an orthographic view of a plant holder with provided plant in a specific position.

FIG. 22 shows that by unfolding lower tabs 458, a provided plant in, for example, an advanced growth stage may be raised relatively higher in the water stream 117 (FIG. 1) so as to expose only its roots to the water stream. At a raised height the plant will receive nutritive water while the growing medium 454, which no longer needs water to germinate its implanted seeds, can be kept out of the water stream.

Figure 23:
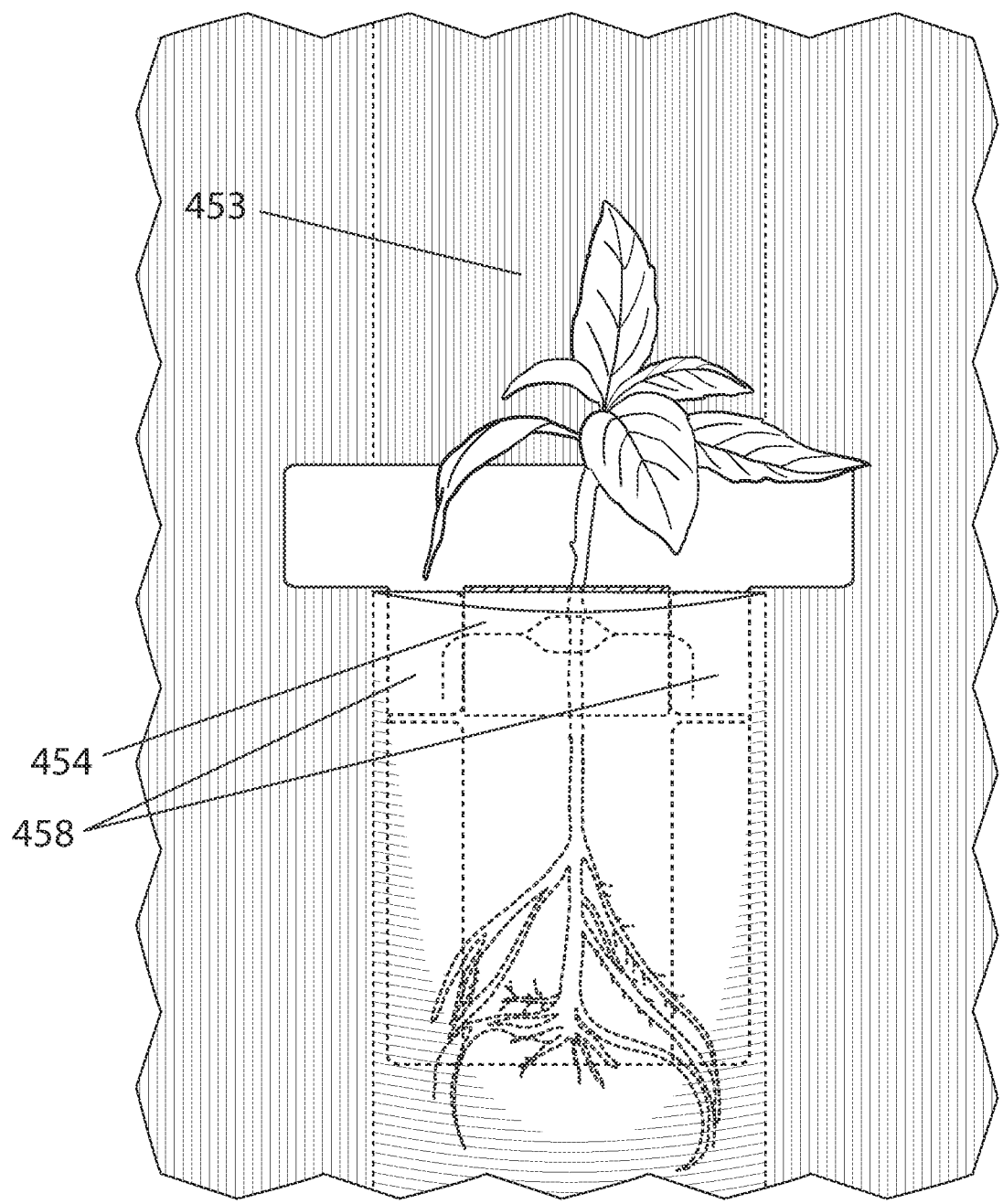
FIG. 23 is an orthographic view of a plant holder with provided plant in another position.

FIG. 23 shows that by folding the lower tabs 458 inward, a provided plant 453 in, for example, an early growth stage, can be held relatively lower in the water stream so that its roots can reach the nutritive water. Similarly, a growing medium 454 that has been implanted with seeds can be held relatively lower in the water stream 117 (FIG. 1) so that its seeds can absorb nutritive water from the system.

The embodiment and its iterations should not be construed as limiting.

The invention claimed is:

1. A hydroponic planter comprising: at least two vertically oriented membranes, each having a top, a bottom, a left side and a right side; and
    said vertically oriented membranes fixedly engaged about a heat sealed pattern; and
    said heat sealed pattern providing a network of ducts; and
    at least one opening that is configured to hold plants; and
    at least a portion of said network of ducts passing through said opening configured to hold plants; and
    a reservoir proximal to the bottom of said vertically oriented membranes, said reservoir including a sealed bottom such that said reservoir is configured to hold liquid that is moved through said network of ducts; and
    said reservoir has a re-sealable opening for accessing said reservoir; and
    a plant holder configured to fit within and removably engage with said opening configured to hold plants; said plant holder comprising:
    a semi-rigid planar form; and at least one tab in said semi-rigid planar form; and
    said tab configured to removably engage with a piece of growing medium; wherein the reservoir is filled with liquid through said re-sealable opening, and liquid is moved through said network of ducts and said tab in said semi-rigid planar form holds a plant with its roots proximal to said piece of growing medium, and said growing medium absorbs, by capillary action, liquid from said network of ducts and transfers said liquid to roots of the plant to feed the plant.

2. The hydroponic planter of claim 1 said plant holder further comprising:
    said semi-rigid form has a relatively wide portion and a relatively narrow portion; and
    said relatively narrow portion is configured to fit inside said opening configured to hold plants; and
    said relatively wide portion is configured to remain outside of said opening configured to hold plants;
    wherein the relatively wide portion prevents the plant holder from falling into said opening.

3. The hydroponic planter of claim 1, said plant holder further comprising:
    a semi-rigid planar form has a front and a back; and
    said semi-rigid planar form has a relatively wide portion and a relatively narrow portion; and
    said relatively narrow portion is configured to fit inside said opening configured to hold plants; and
    said relatively wide portion is configured to remain outside of said opening configured to hold plants; and
    a U-shaped cut in the relatively narrow portion providing a flap;
    said flap providing depth to said relatively narrow portion; and
    said flap providing an opening between said front and back of said plant holder; and
    at least one tab on said flap;
    said flap is removably engaged with a growing medium; wherein
    the relatively wide portion prevents the plant holder from falling into said opening, and, said tab on said flap holds said flap at an acute angle, and the opening between said front and back of said plant holder configured to hold said vertical membranes apart to prevent adhesion when wet.

4. The hydroponic planter of claim 1, said plant holder further comprising:
    said semi-rigid planar form has a relatively wide portion and a relatively narrow portion; and
    said relatively narrow portion is configured to fit inside said opening configured to hold plants; and
    said relatively wide portion is configured to remain outside of said opening configured to hold plants; and
    said relatively narrow portion has at least one vertical fold; wherein
    said vertical fold gives depth to said semi-rigid planar form to keep said opening configured to hold plants, open.

5. The hydroponic planter of claim 1, said plant holder further comprising:
    said semi-rigid planar form has a relatively wide portion and a relatively narrow portion; and
    said relatively narrow portion is configured to fit inside said opening configured to hold plants; and
    said relatively wide portion is configured to remain outside of said opening configured to hold plants; and
    said relatively wide portion has at least one horizontal slit; wherein
    folding a portion of the semi-rigid planar form about said slit reduces the height of said relatively wider portion, thus allowing the plant holder to fit further into said opening configured to hold plants.

* * * * *